(Model.)

F. R. COOPER & J. LEMMON.
PLOW.

No. 253,347. Patented Feb. 7, 1882.

Witnesses.
Perry B. Turpin
F. W. Wheat

Inventors
Francis R. Cooper
John Lemmon
By R.S. & A.P. Lacey Att'ys

UNITED STATES PATENT OFFICE.

FRANCIS R. COOPER AND JOHN LEMMON, OF COLERAIN, OHIO.

PLOW.

SPECIFICATION forming part of Letters Patent No. 253,347, dated February 7, 1882.

Application filed December 14, 1881. (Model.)

*To all whom it may concern:*

Be it known that we, FRANCIS R. COOPER and JOHN LEMMON, citizens of the United States, residing at Colerain, in the county of Belmont and State of Ohio, have invented certain new and useful Improvements in Plows; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in shovel or corn plows; and it consists in the construction and arrangement of the several parts, hereinafter described, and specifically pointed out in the claim.

Figure 1:
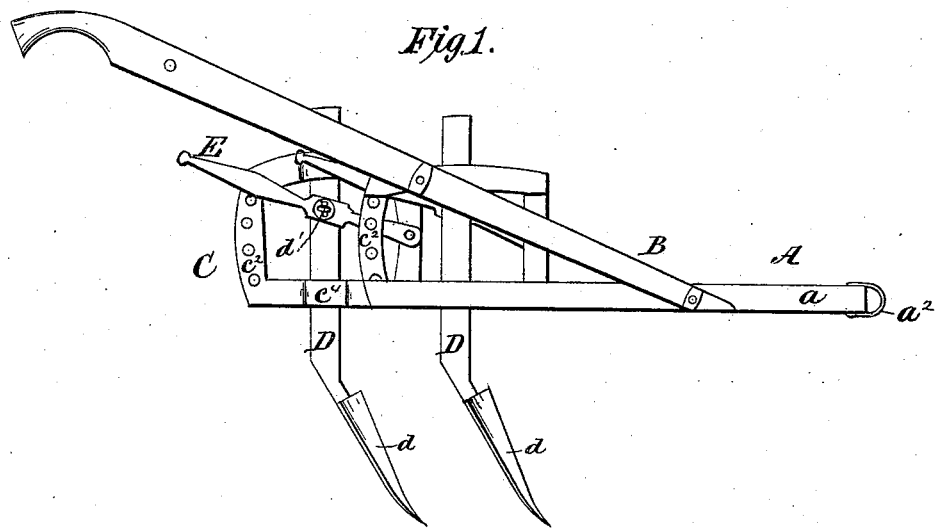
Figure 2:
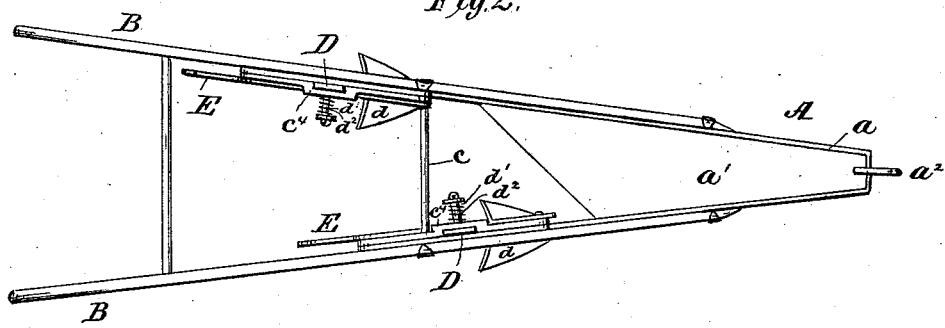
Figure 3:
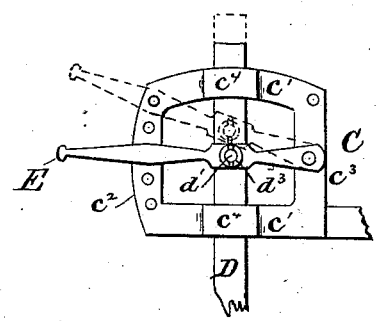
Figure 4:
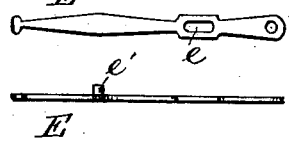

In the drawings, Figure 1 is an elevation, and Fig. 2 is a plan view, of a plow constructed according to our invention; and Figs. 3 and 4 are detail views of parts thereof.

$a\ a$ are the beams, made preferably of a single piece of metal bent into proper form at forward end and braced by intermediate filling-piece, $a'$, as shown. The bar $a$ is extended to rear of piece $a'$ to provide means for securing the standard-adjusting frames, as shown, and will be hereinafter described.

$a^2$ is the clevis, passed around the front of bar $a$ and through the piece $a'$ in rear of bar $a$, as shown.

B are the handles, properly connected to beam A, and extended rearward and inclined upward at proper angle to be grasped by operator.

C C are the standard-adjusting frames, the lower sides of which are secured to the opposite ends of bar $a$, while their top sides are secured to the handles B and connected together by the bar $c$, extended from front part of top of one frame to rear part of top of other frame, the one frame being arranged in advance of the other, as shown. As both of these frames C are alike in construction the description of one will answer for both. The frame C is composed of the end bars, $c'\ c'$, and the side bars, $c^2\ c^3$. The end bars, $c'$, are constructed with bosses $c^4$, through which are cast or formed vertical openings, the one arranged in a vertical line below the other, as shown. The side bar $c^2$ is provided with a series of holes or notches arranged in the arc of a circle and in position to be entered or engaged by the pin on the adjusting-lever, as will be hereinafter described.

D is the standard, having the shovel $d$ secured to lower end, as shown. The standard is formed the shape of the openings through bosses $c^4$, and so as to fit and smoothly slide in said openings.

$d'$ is a pin extended from the standard D, between the end bars, $c'$, of frame C.

$d^2$ is a coil-spring placed around the pin $d'$, and arranged to bear between the adjusting-lever and a washer, $d^3$, secured on outer end of pin $d'$, as shown.

E is the adjusting-lever. It is hinged to the side bar $c^3$ and extended across the frame, and provided with an elongated opening, $e$, which is passed over pin $d'$ on standard D, to which it is held by the coil-spring $d^2$, as shown.

$e'$ is a pin arranged on the lever E in proper position to enter the openings or notches serially arranged on side bar $c^2$, as before described.

It will be observed the pins $d'$ on standards D project toward each other, and that the adjusting-levers are released from the positions in which they are held by pressing them inward or toward each other.

The advantages and operation of our invention are evident. The standards may be adjusted so as to bring the shovels on a level with each other, so as to adapt the plow to use on level ground, or in use on hillside, where our plow is particularly superior. One shovel may be adjusted toward or away from level of other, as desired, according to the steepness of hill and direction of plowing, and the position of shovels may be readily reversed when the end of row on hillside has been reached and the plow turned. This adjustment is also accomplished without affecting the position of the plow beam and handles, which always preserve their upright positions. Thus, in use on a hill, by raising one shovel and lowering the other each shovel may be made to run equal with the other, while the body of the plow stands level. The shovel, also, being held in a vertical position, will not throw the dirt away from the upper row, nor down the hill onto the lower row as badly as when the shovels are run perpendicular to the slant of the ground. Thus the shovels can be run closer to the corn, and will not tend to cover small corn as badly as plows of ordinary construction; also, in plowing corn after it begins to joint and is tender, the body of the plow being in a vertical position, will permit the shovels to be run close to the corn without the body of the plow injuring the same.

Having thus described our invention, what we claim, and desire to secure by Letters Patent, is—

The combination, in a cultivator, of the beams $a$, frames C, with perforated sides $c^2$, and sockets $c^4$, the lever E, having slots $e$ and studs $e'$, the pin and spring $d'$ $d^2$, and standard D, substantially as shown and described.

In testimony whereof we affix our signatures, in presence of two witnesses, on this 25th day of November, 1881.

FRANCIS R. COOPER.
JOHN LEMMON.

Witnesses:
BELLE L. SHARON,
WM. A. SHARON.